United States Patent [19]

Lane

[11] 4,400,187
[45] Aug. 23, 1983

[54] DEVICE FOR PREVENTING CIRCULATION OF LIQUID WATER ENTRAINED IN COMPRESSED AIR

[75] Inventor: Arlo E. Lane, Reading, Mich.

[73] Assignee: Roy E. Coffman, Tekonsha, Mich.; a part interest

[21] Appl. No.: 338,913

[22] Filed: Jan. 12, 1982

Related U.S. Application Data

[63] Continuation of Ser. No. 134,876, Mar. 28, 1980, abandoned.

[51] Int. Cl.$^3$ .................................................. B01D 53/04
[52] U.S. Cl. ................................................ 55/387; 55/32; 55/DIG. 17
[58] Field of Search ................ 55/29, 32, 33, 35, 387, 55/486, 487, 500, 501, 503, 520, 528, DIG. 17; 210/94, 238, 437, 446–448, 452, 454, 484, 489, 497.1, 497.01

[56] References Cited

U.S. PATENT DOCUMENTS

| | | | |
|---|---|---|---|
| 1,337,020 | 4/1920 | Milker | 210/437 X |
| 1,976,547 | 10/1934 | Dumas | 210/452 X |
| 2,540,564 | 2/1951 | Zacko | 210/448 |
| 2,793,752 | 5/1957 | Jay | 210/448 X |
| 3,317,043 | 5/1967 | Vanderpoel | 210/448 X |
| 3,815,744 | 6/1974 | Vanderpoel | 210/448 X |
| 4,116,650 | 9/1978 | Lane | 55/387 |
| 395 498 | 7/1933 | U. Kingdom | 55/500 |

FOREIGN PATENT DOCUMENTS

395498 7/1933 United Kingdom .................. 55/500

Primary Examiner—Robert H. Spitzer
Attorney, Agent, or Firm—James W. Pearce; Roy F. Schaeperklaus

[57] ABSTRACT

A tubular container mounted in series with a compressed air line. The container includes a hollow cylindrical body, a hollow cylindrical screen member mounted inside the body and means supporting the hollow cylindrical screen in communication with an entry end of the body. A plug of porous water absorbent material surrounds the screen member. The plug of porous material absorbs droplets of water in the stream of compressed air passing through the tubular container and provides a surface from which the water evaporates as the compressed air passes through the plug.

9 Claims, 18 Drawing Figures

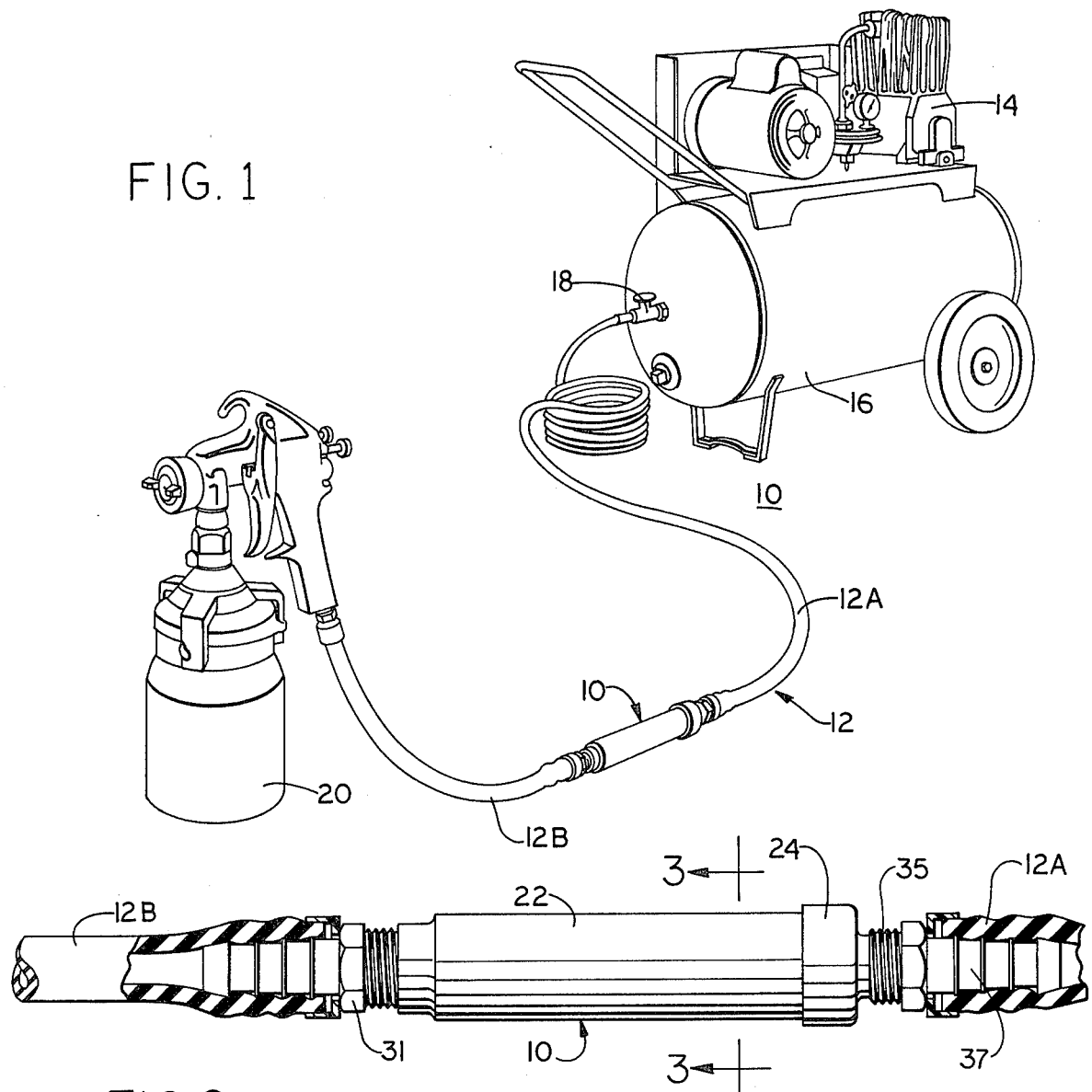
FIG. 1
FIG. 2
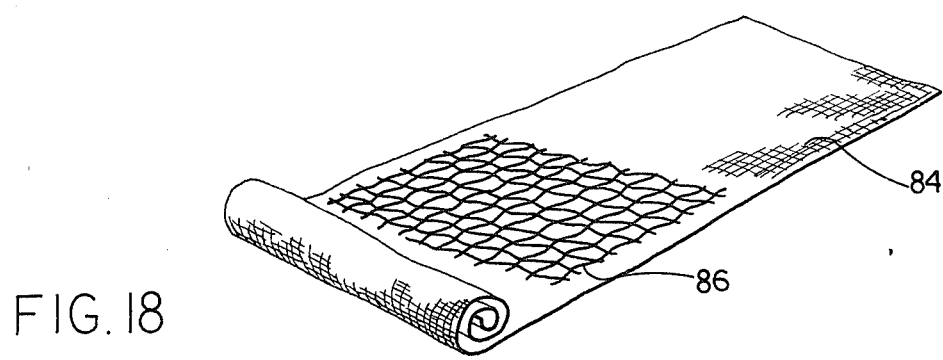
FIG. 18

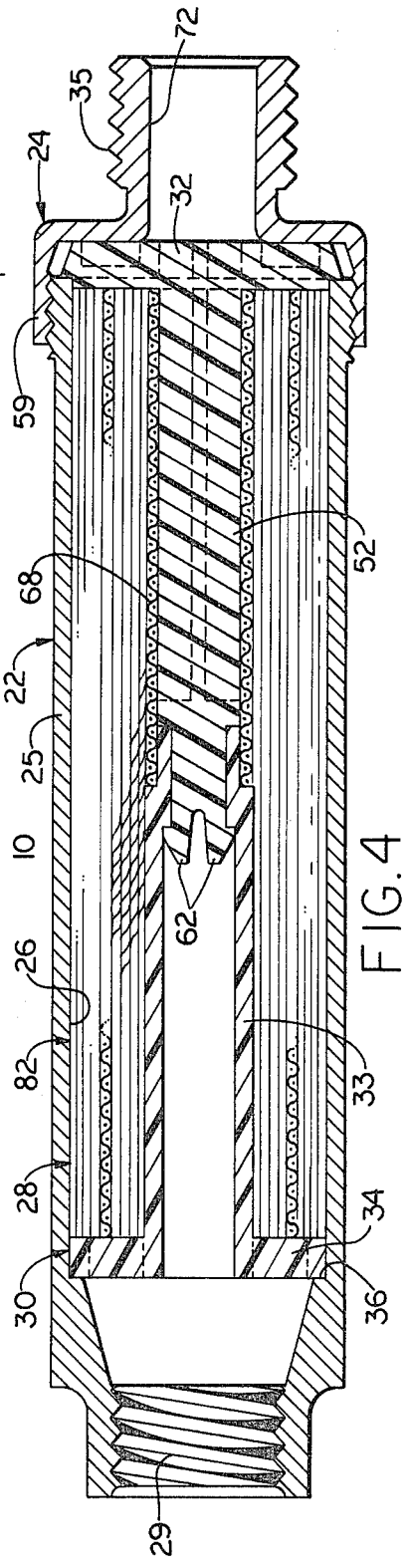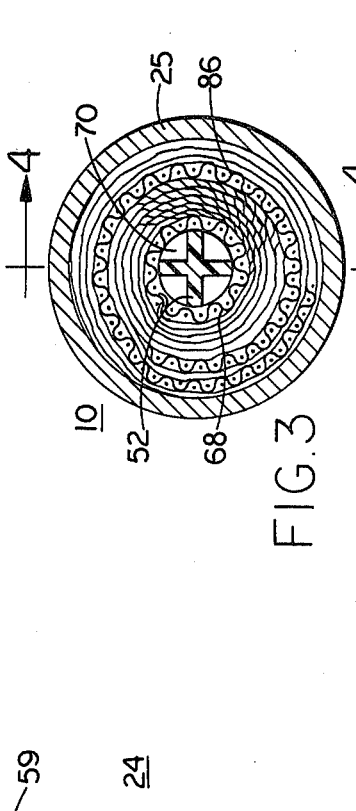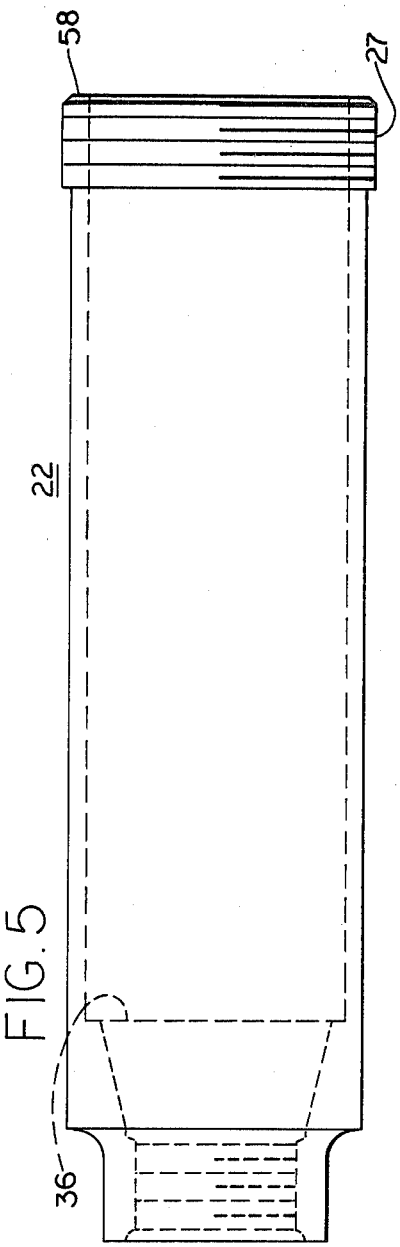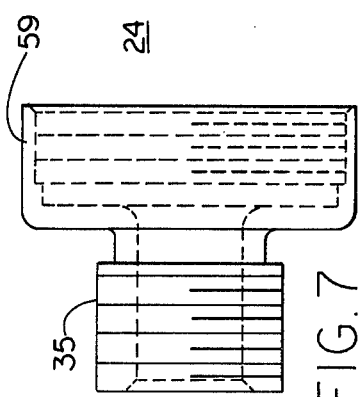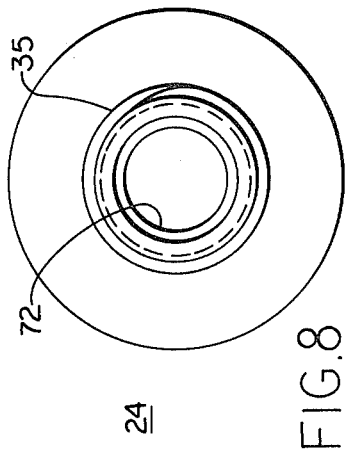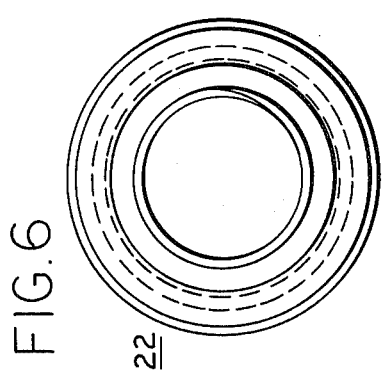

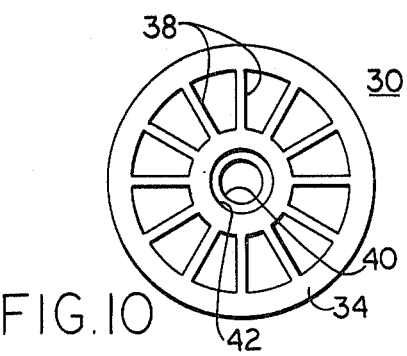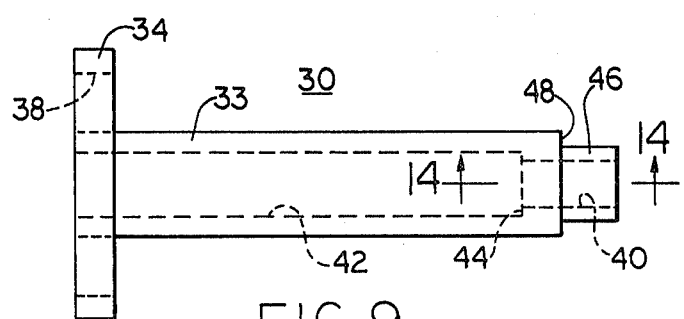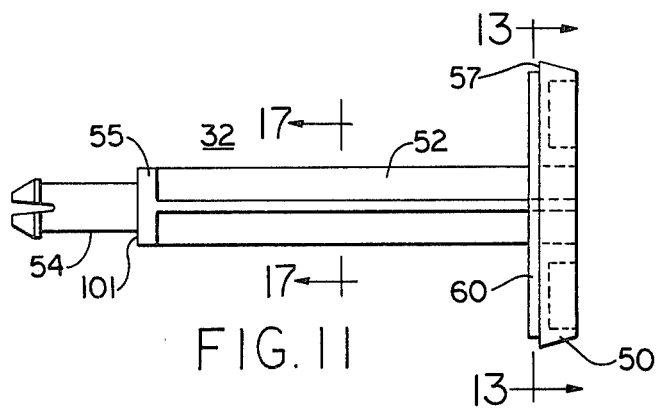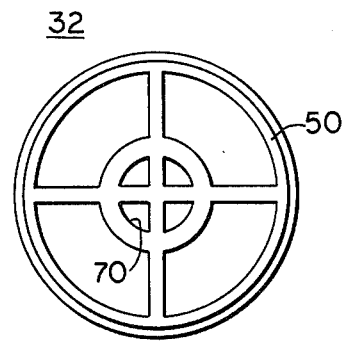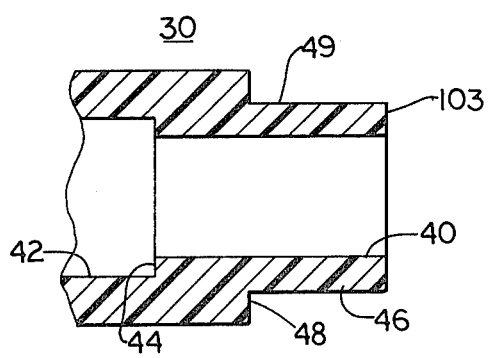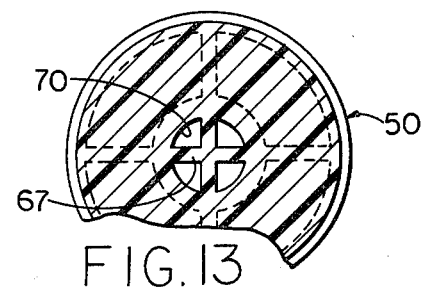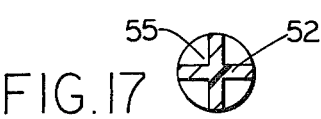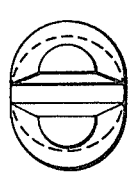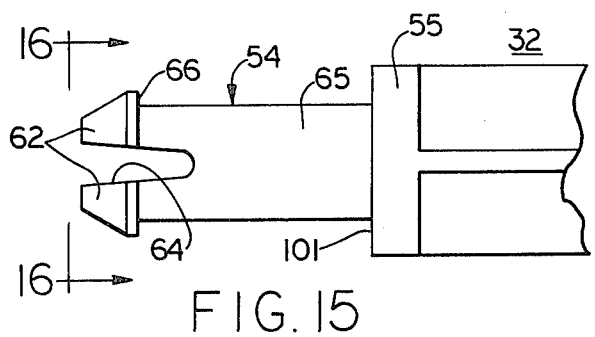

DEVICE FOR PREVENTING CIRCULATION OF LIQUID WATER ENTRAINED IN COMPRESSED AIR

This is a continuation of my copending application Ser. No. 134,876 filed Mar. 28, 1980, now abandoned.

This invention relates to pneumatic equipment. More particularly, this invention relates to a device for preventing circulation of liquid water entrained in compressed air and represents an improvement in the type of device shown in my U.S. Pat. No. 4,116,650.

It is not unusual for small droplets of water to become entrained in compressed air. If the compressed air is used in paint spraying, such droplets of water can cause imperfections in the paint job. If the compressed air is used to operate pneumatic tools or the like the entrained water can cause damage to parts of the pneumatically operated tools.

An object of this invention is to provide a device for a compressed air line which eliminates entrained water. The device includes a porous plug of fibrous absorbent material through which the compressed air passes and which absorbs the entrained droplets of water and in which is evaporated from the plug as the air passes through the plug after droplets of entrained water have been absorbed.

A further object of this invention is to provide such a device in which the plug is mounted on a hollow screen through which moisture laden air is introduced into the pad to provide a large surface area receiving the moisture laden air.

Briefly, this invention provides a tubular container in a compressed air line through which compressed air passes. A hollow cylindrical screen supports a porous plug of fibrous absorbent material inside the container. The cylindrical screen receives air from the line and the plug receives the air from the cylindrical screen. The plug can be formed of a fabric sheet of cotton gauze or the like rolled with a sheet of screen material which keeps the plug dimensionally stable to form a plug which fits inside the container. Plug supporting members mounted inside the container support the cylindrical screen and the plug. The compressed air passes through the plug so that any entrained droplets of water in the air are absorbed by the gauze of the plug. As more air passes through the plug, absorbed moisture is vaporized into the air to remove the moisture from the plug.

The above and other objects and features of the invention will be apparent to those skilled in the art to which this invention pertains from the following detailed description and the drawings, in which:

FIG. 1 is a perspective view of a compressed air painting system which includes a device for removing entrained water which is constructed in accordance with an embodiment of this invention;

FIG. 2 is a view in side elevation of the device for removing entrained water which is shown in FIG. 1, fragmentary portions of hose sections being shown in association therewith;

FIG. 3 is a view in section taken on an enlarged scale on the line 3—3 in FIG. 2;

FIG. 4 is a view section taken on the line 4—4 in FIG. 3;

FIG. 5 is a view in side elevation of a body member of the device;

FIG. 6 is a view in end elevation of the body member;

FIG. 7 is a view in side elevation of an end closure member of the device;

FIG. 8 is a view in end elevation of the end closure member;

FIG. 9 is a view in side elevation of a first plug support member of the device;

FIG. 10 is a view in end elevation of the first plug support member;

FIG. 11 is a view in side elevation of a second plug support member of the device;

FIG. 12 is a view in end elevation of the second plug support member;

FIG. 13 is a view in section taken on the line 13—13 in FIG. 11;

FIG. 14 is a view in section taken on an enlarged scale on the line 14—14 in FIG. 9;

FIG. 15 is an enlarged fragmentary view of the second plug support member;

FIG. 16 is a view in end elevation of the second plug support member looking in the direction of the arrows 16—16 in FIG. 15;

FIG. 17 is a view in section taken on the line 17—17 in FIG. 11; and

FIG. 18 is a perspective view of an assembly of a fabric strip and a screen element prior to forming into a plug of the device.

In the following detailed description and the drawings, like reference characters indicate like parts.

In FIG. 1 is shown a pneumatically powered paint spraying system which includes a device 10 for removing entrained water which is constructed in accordance with an embodiment of this invention. The device 10 is mounted in a pneumatic line 12 between sections 12A and 12B thereof so that the device is in series between the sections of the pneumatic line. Air is compressed by a compressor 14 and air under pressure is stored in a tank 16. A valve 18 supplies air under pressure from the tank 16 to the pneumatic line 12. The line 12 supplies the air to a paint spray gun 20 after the air has passed through the device 10.

Details of construction of the device 10 are shown in FIGS. 2-18 inclusive. The device 10 includes a tubular casing member of body 22 (FIGS. 4-7 inclusive) and a hollow end closure member 24. The casing 22 has an annular wall 25 defining a central bore or chamber 26. External threads 27 on an end portion of the casing member 22 receive internal threads on the end closure member 24. Internal threads 29 on the body 22 can support a nipple 31 on which the line section 12B is mounted. External threads 35 on the end closure member 24 can support a nipple 37 on which the line section 12A is mounted.

Inside the casing 22 is mounted a plug assembly 28. The plug assembly 28 includes a first plug support member 30 (FIGS. 9 and 10) and a second plug support member 32 (FIGS. 11 and 12). The plug members can be formed of resilient plastic material or the like.

The first plug support member 30 (FIGS. 11 and 12) includes an elongated main tubular portion 33 and a circular head 34 at one end of the main tubular portion 33. The circular head 34 can fit against an internal shoulder 36 in the casing 22, as shown in FIG. 4, with the tubular portion 33 extending along the axis of the casing 22 spaced from the wall 25 thereof. The head 34 fits tightly inside the bore 26 to form a seal therewith. Windows 38 are formed in the circular head 34 to permit fluid to pass therethrough. A bore 40 and a counterbore 42 are provided in the body 33 to form an annular shoulder 44 therein. An end portion 46 of the tubular portion 33 is of reduced external diameter to provide an external shoulder 48 and a cylindrical wall 49 thereon.

The second plug support member 32 (FIGS. 11 and 12) includes a generally circular head 50, an elongated body 52 of cross-shape in section, and a catch portion 54. A short cylindrical section 55 connects the body 52 to the catch portion 54. A shoulder 57 is disposed on the head 50. The head 50 can be received inside a body portion of the end closure member 24 with the shoulder 57 engaging an end wall 58 of the casing member 22 and a portion 60 of the head 50 of reduced diameter fitting inside the casing member 22 so that there is a seal between the head 50 and the interior of the bore 26. The catch portion 54 includess bifurcations 62 which are separated by a slot 64. A cylindrical section 65 of the catch portion connects the bifurcations 62 to the cylindrical section 55. The bifurcations 62 can be compressed to enter the bore 40 so that the bifurcations can be lodged in the counterbore 42 with a shoulder 66 on the bifurcations engaging the shoulder 44 and the cylindrical section 65 engaging the interior of the bore 40 to form a seal therebetween so that the plug support members 30 and 32 are held in assembled relation with outer edges of arms 67 of the body 52 of the second plug support member 32 aligned with the wall 49 of the end portion 46 of the first plug support member 30. A shoulder 101 on the section 55 of the second plug support member 32 can engage an end face 103 of the end portion 46 of the first plug support member 30. A hollow cylindrical screen 68 (FIG. 4) is mounted on the elongated cross-shaped body 52 and on the wall 49 of the end portion 46. The screen 68 can be a fine mesh screen such as a 60 mesh screen and can be formed of material such as stainless steel which is not affected by the compressed air and water which passes therethrough. The screen 68 serves to break up droplets of water in the fluid and to catch any large solid particles which can be carried by the compressed air. Sector shaped openings 70 in the circular head 50 permit fluid in an entry cavity or bore 72 of the end closure member 24 to enter the interior of the cylindrical screen 68. The circular portion 55 disposed between the catch portion 54 and the cross-shaped body 52 closes ends of spaces 70 between the arms 67 of the cross-shaped body 52.

A porous plug 82 is mounted on the cylindrical screen 68 and on the main tubular portion 33 of the first plug support member 30. The plug 82 is formed from a strip 84 (FIG. 18) of fibrous web material such as cotton gauze. A length of screening 86, which can be aluminum window screening or the like, is laid on the web material centrally thereof and the web material is wound on the cylindrical screen 68 and the tubular portion 33 with the screening 86 spirally wound between convolutions of the strip 84 of web material. The plug is held in place between the heads 34 and 50 of the plug support members.

Compressed air from the tank 16 (FIG. 1) is caused to flow through the plug assembly 28. The air along the line section 12A and the nipple 37 and enters the device 10 through the end closure member 24 and passes axially through the openings 70, and radially through the cylindrical screen 68 and into the porous plug 82 when the valve 18 is open, and any droplets of water entrained in the air stream are absorbed by the material of the plug 82, and any fine particles of solid material in the air are caught in the plug 82. The compressed air passes both radially and axially along the plug as the water and fine particles are removed. The air passes through the plug 82 and the windows 38 and leaves the device 10 through the nipple 31 and the line section 12B. As the air continues to pass through the plug, the absorbed water can be evaporated from the material of the web and is discharged as vapor.

The plug assembly 28 can be removed and replaced if necessary.

The device has been described with particular reference to the removal of entrained water from a stream of compressed air, but it can be used in connection with other gas streams such as a stream of vaporized liquified petroleum or propane, or a stream of other gas such as nitrogen, hydrogen, or argon or the like which can carry entrained liquid droplets.

The device which has been described above and illustrated in the drawings is subject to structural modification without departing from the spirit and scope of the appended claims.

Having described my invention, what I claim as new and desire to secure by letters patent is:

1. In combination with a compressed air line, a tubular container in series with the compressed air line which comprises a hollow cylindrical body having an entry end and an exit end, a hollow cylindrical screen member mounted inside the body, means supporting the hollow cylindrical screen member in communication with the entry end of the cylindrical body, there being an annular space inside the body surrounding the hollow cylindrical screen member, a plug of porous water absorbent material surrounding and in communication with the hollow cylindrical screen member and inside the body and filling the space between the hollow cylindrical screen member and the body, and means directing air from the plug into the exit end of the cylindrical body, the plug of porous material absorbing droplets of water in the stream of compressed air passing through the tubular container and providing a surface from which the water evaporates as the compressed air passes through the plug, the means supporting the hollow cylindrical screen member including a spool shaped plug support assembly including a central stem portion extending lengthwise of and inside the hollow cylindrical screen member, there being an opening between the central stem portion and the hollow cylindrical screen member and heads transversely spanning the inside of the body at opposite ends of the stem portion, the head adjacent the entry end closing and sealed to the entry end portion of the body, the plug extending between the heads, there being opening means in one of the heads to direct air entering the body into the opening in the interior of the screen between the central stem portion and the hollow cylindrical screen member and window means in the other head directing air from the plug of porous material to be discharged from the body.

2. In combination with a compressed air line, a tubular container comprising a tubular container body and a tubular container end closure member connecting inlet and exit portions of the compressed air line, the body having an entry end and an exit end, a hollow cylindrical screen member mounted inside the body, means supporting the hollow cylindrical screen member in communication with an entry end of the cylindrical body, the means supporting the hollow cylindrical screen member including a spool shaped plug support assembly including a central stem portion extending lengthwise of and inside the hollow cylindrical screen member, there being an opening between the central stem portion and the hollow cylindrical screen member extending from the entry end of the hollow cylindrical screen member toward the opposite end thereof and heads at opposite ends of the stem portion closing and sealed to portions of the body respectively adjacent the entry and exit ends thereof, there being space inside the body between the hollow cylindrical screen member, the spool shaped plug support assembly and the body, a plug of porous water absorbent material surrounding and in communication with the hollow cylindrical screen member and inside the body and filling the space between the hollow cylindrical screen member, the spool shaped plug support assembly and the body, there being opening means in one of the heads to direct air entering the body into an opening in the interior of the hollow cylindrical screen member, window means in the other head directing air from the plug of porous material to be discharged from the body, one of the head members being slideably received inside the body for sealing engagement therewith, the periphery of the other of the head members being in sealed relation to the tubular container, the plug of porous material absorbing droplets of water in the stream of compressed air passing through it from the hollow cylindrical screen member to the window means and providing a surface from which the water evaporates as the compressed air passes through the plug.

3. In combination with a compressed air line, a tubular container comprising a tubular container body and a tubular container end closure member connecting inlet and exit portions of the compressed air line, the body having an entry end and an exit end, a hollow cylindrical screen member mounted inside the body, means supporting the hollow cylindrical screen member in communication with an entry end of the cylindrical body, the means supporting the hollow cylindrical screen member including a spool shaped plug support assembly including a central stem portion extending lengthwise of and inside the hollow cylindrical screen member, there being an opening between the central stem portion and the hollow cylindrical screen member extending from the entry end of the hollow cylindrical screen member toward the opposite end thereof and heads transversely spanning the inside of the body at opposite ends of the stem portion, the head adjacent the entry end closing and sealed to the entry end portion of the body adjacent the entry end thereof, there being space inside the body between the hollow cylindrical screen member, the spool shaped plug support assembly and the body, a plug of porous water absorbent material surrounding and in communication with the hollow cylindrical screen member and inside the body and filling the space between the hollow cylindrical screen member, the spool shaped plug support assembly and the body, there being opening means in one of the heads to direct air entering the body into an opening in the interior of the hollow cylindrical screen member, window means in the other head directing air from the plug of porous material to be discharged from the body, one of the head members being slideably received inside the body for engagement therewith, the periphery of the other of the head members being in sealed relation to the tubular container, the plug of porous material absorbing droplets of water in the stream of compressed air passing through it from the hollow cylindrical screen member to the window means and providing a surface from which the water evaporates as the compressed air passes through the plug.

4. A disposable filter plug assembly adapted for replaceable insertion into a pneumatic liquid vaporizer housing which includes a casing having a cylindrical bore with a first fluid port at one axial end of said bore and an open second end remote from said first fluid port and surrounded by an axially outwardly facing end wall, and a cap including a second fluid port removably secured to said casing over said open end, one of said fluid ports being predesignated a fluid entrance port and the other being predesignated a fluid exit port, said disposable filter plug assembly comprising a spool-shaped plug support having a pair of spaced circular heads and a central stem extending coaxially between said heads, a first of said heads having a central opening extending therethrough adjacent said stem and the second of said heads having at least one opening extending therethrough radially outwardly spaced from said stem, one of said heads having a first diameter adapted to be slidably received within said bore from said open end and the other of said heads having a second diameter greater than said first diameter for axial abutting engagement with said end wall such that said plug assembly is adapted to be inserted into said casing only from a direction which places said first head adjacent the said one of said fluid ports predesignated said entry port and said second head adjacent the said other of fluid ports predesignated said fluid exit port, a hollow cylindrical screen surrounding said stem for less than the entire length of said stem and in fluid communication with said central opening in said first head, a plug of water absorbent material surrounding said stem extending axially between said heads and radially from adjacent said stem and screen to said first diameter, and means carried by said stem adjacent said first head for directing fluid from said central opening radially outwardly through said screen into said plug, axially through said plug and then axially through said at least one opening in said second head.

5. A disposable filter plug assembly adapted for replaceable insertion into a pneumatic liquid vaporizer housing which includes a casing having a cylindrical bore with a first fluid port at one axial end of said bore and an open second end remote from said first fluid port and surrounded by an axially outwardly facing end wall, and a cap including a second fluid port removably secured to said casing over said open end, one of said fluid ports being predesignated a fluid entrance port and the other being predesignated a fluid exit port, said disposable filter plug assembly comprising a spool-shaped plug support having a pair of spaced heads and a central stem extending in an axial direction between said heads, a first of said heads having a central opening extending therethrough adjacent said stem and the second of said heads having at least one opening extending therethrough radially outwardly of said stem, one of said heads having a first dimension and adapted to be slidably received within said bore from said open end and to cooperate with said casing and the other of said heads having a second dimension greater than said first dimension and adapted for axial abutting engagement with said end wall such that said plug assembly is adpated to be inserted into said casing only from a direction which places said first head adjacent the said one of said fluid ports predesignated said entry port and said second head adjacent the said other of fluid ports predesignated said fluid exit port, a hollow cylindrical screen surrounding said stem for less than the entire length of said stem and in fluid communication with said central opening in said first head, a plug of water absorbent material surrounding said stem extending axially between said heads and radially from adjacent said stem and screen to adjacent said first dimension, and means carried by said stem adjacent said first head for directing fluid from said central opening radially outwardly through said screen into said plug, axially through said plug and then axially through said at least one opening in said second head.

6. For use in combination with a compressed air line, a tubular container comprising a tubular container body and means at opposite ends of said container body respectively defining inlet and exit portions of said container for connection to a compressed air line, a hollow cylindrical screen member within said body, means supporting said hollow cylindrical screen member in communication with said inlet end of said body, said means supporting said hollow cylindrical screen member including a spool shaped plug support assembly having a central stem portion extending lenthwise of said body and supporting said hollow cylindrical screen member within said body, said central stem portion being in open communication with said inlet end of said body for admitting compressed air interiorly of said hollow cylindrical screen member from said inlet end in said body toward said exit end of said body, and heads at opposite ends of said stem portion transversely closing and sealed to portions of said body respectively adjacent to said inlet and exit ends of said body, there being space inside said body radially between said hollow cylindrical screen member, said spool stem portion and said body, and axially between said heads, a plug of porous water absorbent material surrounding and in communication with said hollow cylindrical screen member inside said body and filling said space between said hollow cylindrical screen member, said stem portion and said body and between said heads, there being opening means in the one of said heads adjacent to said inlet end of said body to direct air entering said body into the interior of said hollow cylindrical screen member, window means in the other said head for directing air from said plug of porous material to said exit end of said body, the peripheries of said heads being in sealed relation to said body, said plug of porous material being adapted to absorb droplets of water in a stream of compressed air passing through said plug from said hollow cylindrical screen member to said window means, and providing a surface from which water may evaporate as compressed air passes through said plug.

7. The invention set forth in claim 6 wherein said central stem extends coaxially within said body, said hollow cylindrical screen member being disposed coaxially within said body, and wherein said opening means in said one of said heads comprises a central opening in said one of said heads for admitting compressed air internally of said screen member, said interior of said screen member opposite said opening means being closed.

8. The invention set forth in claim 7 wherein said window means comprises a plurality of openings in said other head disposed in an array surrounding said stem portion radially between said stem portion and said body.

9. For use in combination with a compressed air line, a tubular container comprising a tubular container body and means at opposite ends of said container body respectively defining inlet and exit portions of said container for connection to a compressed air line, a hollow cylindrical screen member mounted within said body, means supporting said hollow cylindrical screen member in communication with said inlet end of said body, said means supporting said hollow cylindrical screen member including a spool shaped plug support assembly having a central stem portion extending lengthwise of said body and supporting said hollow cylindrical screen member within said body, said central stem portion being in open communication with said inlet end of said body for admitting compressed air interiorly of said hollow cylindrical screen member from said inlet end of said body toward the opposite end of said hollow cylindrical screen member closed by said central stem portion spaced from the ends of said body, and heads at opposite ends of said stem portion transversely closing and sealed to portions of said body respectively adjacent to said inlet and exit ends of said body, there being space inside said body radially between said hollow cylindrical screen member, said spool stem portion and said body, and axially between said heads, a plug of porous water absorbent material surrounding and in communication with said hollow cylindrical screen member inside said body and filling said space between said hollow cylindrical screen member, said stem portion and said body and between said heads, there being opening means in the one of said heads adjacent to said inlet end of said body to direct air entering said body into the interior of said hollow cylindrical screen member, window means in the other said head for directing air from said plug of porous material to said exit of said body, the peripheries of said heads being in sealed relation to said body, said plug of porous material being adapted to absorb droplets of water in a stream of compressed air passing through said plug from said hollow cylindrical screen member to said window means, and providing a surface from which water may evaporate as compressed air passes through said plug.

* * * * *